United States Patent [19]

Yilmaz et al.

[11] Patent Number: 5,715,156
[45] Date of Patent: Feb. 3, 1998

[54] METHOD AND APPARATUS FOR PROVIDING AC OR DC POWER FOR BATTERY POWERED TOOLS

[76] Inventors: G. George Yilmaz, P. O. Box 2592, Naples, Fla. 33939; Simon R. Sainsbury, 212 Coconut Dr., Indialantic, Fla. 32903

[21] Appl. No.: 669,226

[22] Filed: Jun. 24, 1996

[51] Int. Cl.$^6$ ............................................. H02M 1/10
[52] U.S. Cl. .................. 363/142; 307/26; 307/80; 439/500; 439/956
[58] Field of Search ........................ 320/56; 307/22, 307/26, 43, 72, 75, 80; 439/500, 956, 218, 221, 502, 144; 363/142, 84

[56] References Cited

U.S. PATENT DOCUMENTS

| | | | |
|---|---|---|---|
| 2,590,805 | 3/1952 | Vitale | 307/150 |
| 4,835,410 | 5/1989 | Bhagwat et al. | 307/64 |
| 5,497,245 | 3/1996 | Uchida | 358/406 |

*Primary Examiner*—Peter S. Wong
*Assistant Examiner*—Shawn Riley
*Attorney, Agent, or Firm*—Merrill N. Johnson

[57] ABSTRACT

Method and apparatus for providing either AC mains or DC power for an electrically powered tool having a motor designed to be powered by a removable battery pack which fits into a recess in the tool. The apparatus includes a power block capable of being powered either by AC mains or DC power. The power block includes an AC to DC convertor, a voltage input selector, a DC to DC convertor, an auto voltage selector, and a solid state current monitor which automatically sets the voltage and current to be delivered to the tool motor at the voltage and current required to produce the tool motor's full rated driving torque. The apparatus also includes an AC mains plug and a first flexible line running from the AC mains plug to the power block, a DC plug and a second flexible line running from the DC plug to the power block, a multi-pin male DC plug and a third flexible line running from the male DC plug to the power block and a DC power connector designed to receive the male DC plug and fit into the recess in the tool which receives the battery pack.

3 Claims, 4 Drawing Sheets

METHOD AND APPARATUS FOR PROVIDING AC OR DC POWER FOR BATTERY POWERED TOOLS

FIELD OF THE INVENTION

Our invention lies in the field of power tools and more specifically to means for providing AC or DC power to tools designed to be powered by batteries.

BACKGROUND OF THE INVENTION

The flexibility and convenience of battery powered hand tools has led to a remarkable growth in the number of battery powered hand tools such as drills, sanders, screw drivers and routers. Purchasers of these tools, which often are sold as kits containing several different battery powered tools and one or more battery packs and a device for recharging exhausted or rundown battery packs, are motivated by the freedom that battery powered tools provide.

Despite their convenience, battery powered hand tools as presently marketed have a number of limitations. Unless the user has a supply of fully charged battery packs, the user must wait for a recharged battery for from about one to over ten hours before being able to use the tool. Equally important, the power tool's full rated driving torque is only achieved when the tool motor is fed full voltage and current and this torque is only achieved with a new fully charged battery and as a result the delivered torque of the battery powered tool decreases by the number of battery recycles.

As a result, users of battery powered hand tools often purchase AC mains powered tools to supplement their battery powered tools during periods of battery recharging and when the job requires a tool with full torque.

SUMMARY OF THE INVENTION

Our invention provides a method and apparatus for enhancing the usefulness of battery powered tools. Briefly put, when the battery powered tool is used where AC or DC power is available, our invention permits the normally battery powered tool to be powered by AC or DC power. This has the advantage of a tool which can be used without having to wait while its batteries are being recharged. Additionally, the tool can now be used on jobs that require the tool to be operated at full rated driving torque. Use of AC or DC power will decrease use of the batteries which will extend the rechargeable life of the batteries, also creating less environmental problems caused by disposal of unusable batteries.

The apparatus includes a unique AC/DC power block capable of being supplied by either AC mains or DC power by a pair of flexible cables whose opposite ends include either an AC mains plug or a DC plug. The AC/DC power block includes an AC/DC voltage controller and solid state current monitor which automatically sets voltage and current to produce the tool motor's full rated driving torque.

The AC/DC power block delivers power to the tool's motor through a cable ending in a locking male DC power connector which is plugged into a battery eliminator module sized to fit into the recess in the tool normally filled by its battery pack. Due to different sizes and shapes of the battery packs used by different power tool manufacturers, several different shapes of our battery eliminator module have been devised.

The components of our invention may be included with a kit of several different battery powered hand tools or the components sold separately for use with one or more battery powered hand tools.

DETAILED DESCRIPTION OF THE PREFERRED EMBODIMENT

Figure 1:
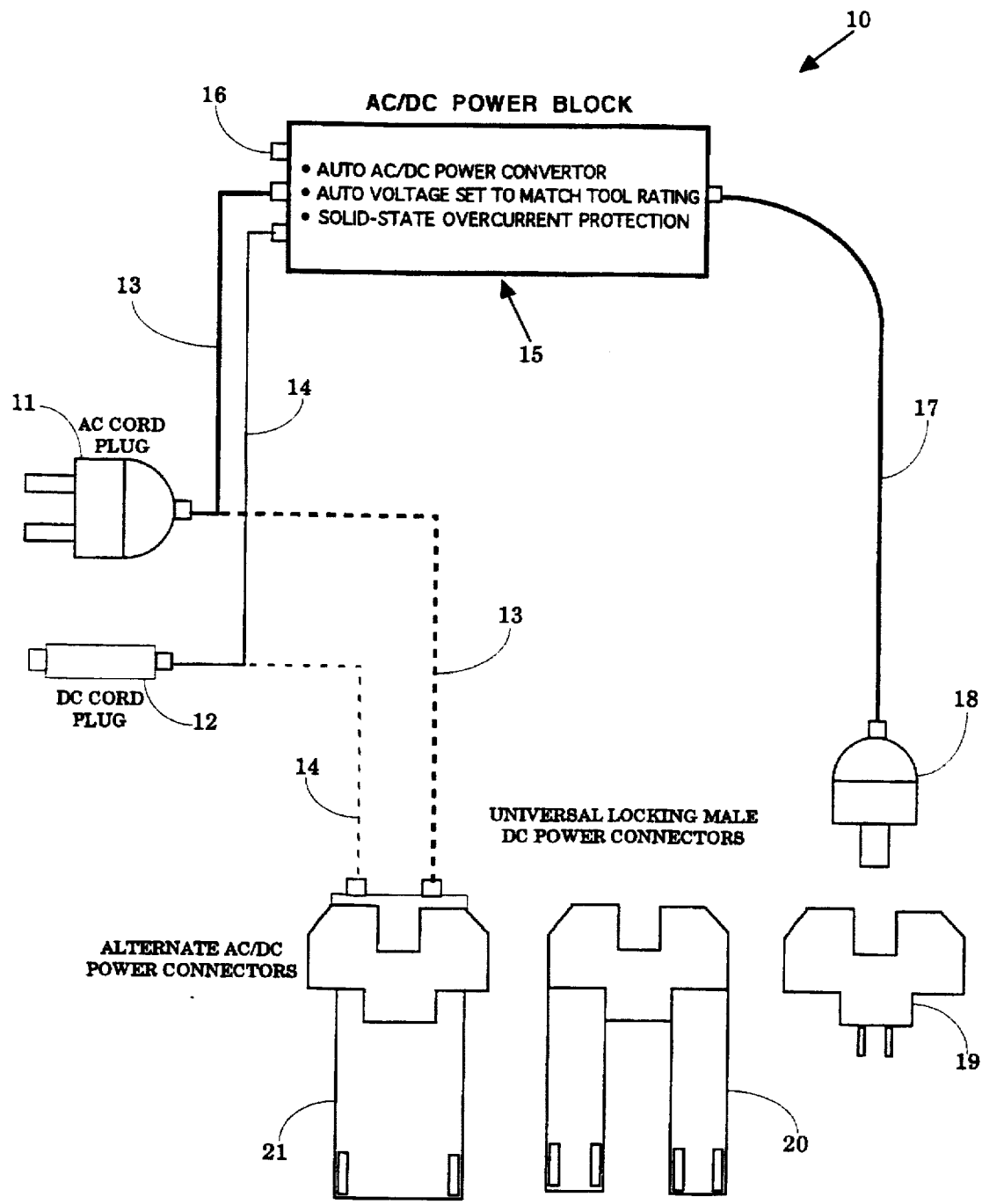
FIG. 1 is a pictorial description showing the components of our invention.

FIG. 1 illustrates our device 10 for providing AC or DC power for battery powered tools. AC mains power is fed to device 10 from AC cord plug 11 and flexible line 13 to AC/DC power block 15. In the event AC mains power is not available, DC power can be used from any DC power source such as the cigarette lighter receptacle on an automobile or a motor home. DC cord plug 12 can be inserted into the source of DC power and fed through flexible line 14 to AC/DC power block 15.

Electric power having the correct voltage and current selected by power block 15 is fed through flexible electric line 17 to a 10 pin male plug 18 with a finger release lock. Plug 18 is fitted into a battery eliminator module sized to fit into the recess in the tool normally filled by its battery pack. Two different forms of battery eliminator modules 19 and 20 are illustrated in FIG. 1.

Alternatively if it is desired to use our device 10 to power an AC/DC power connector directly insertable into a battery powered tool, the alternate AC/DC power connector 21 is connectable to either AC cord plug 11 or DC cord plug 12 as shown in FIG. 1.

Figure 2:
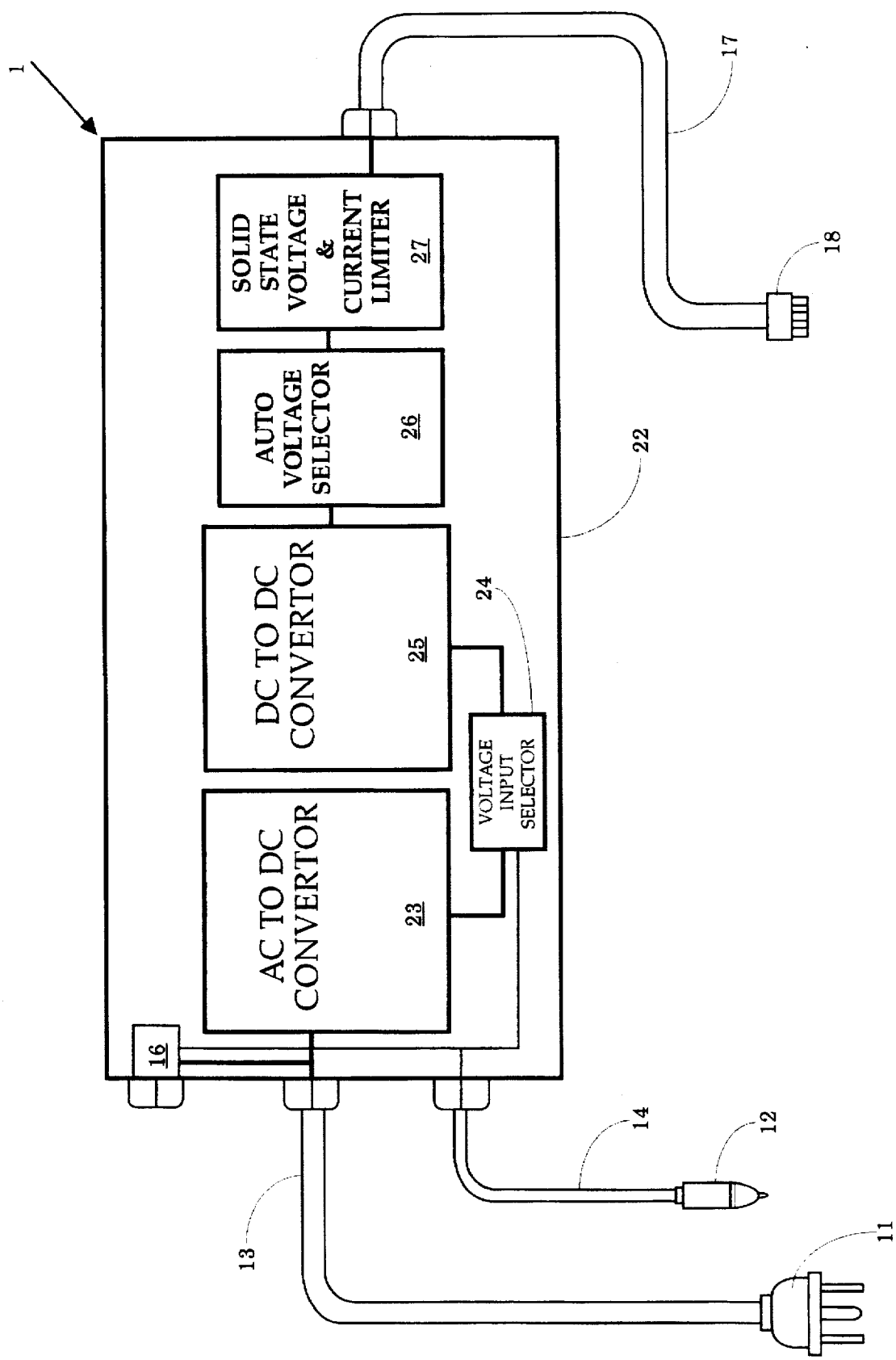
FIG. 2 is a pictorial description of a preferred embodiment of the AC/DC power block.

The major components of AC/DC power block 15 are contained within a housing 22 as shown in FIG. 2. If power block 15 is powered by alternating current, the current flowing from AC plug 11 and line 13 flows through fuse block 6 into AC to DC convertor 23 and converted into DC power transmitted by voltage input selector 24 to auto voltage selector 26. If instead the power block is powered by direct current, the current flowing from DC plug 12 and line 14 flows through fuse block 16 directly into DC to DC convertor 25. The resulting power is transmitteed by voltage input selector 24 to auto voltage selector 26 and thence to solid state voltage and current limiter 27. The resulting DC power flows through flexible cord 17 to a multi pin plug 18 as shown in FIG. 2.

Figure 3:
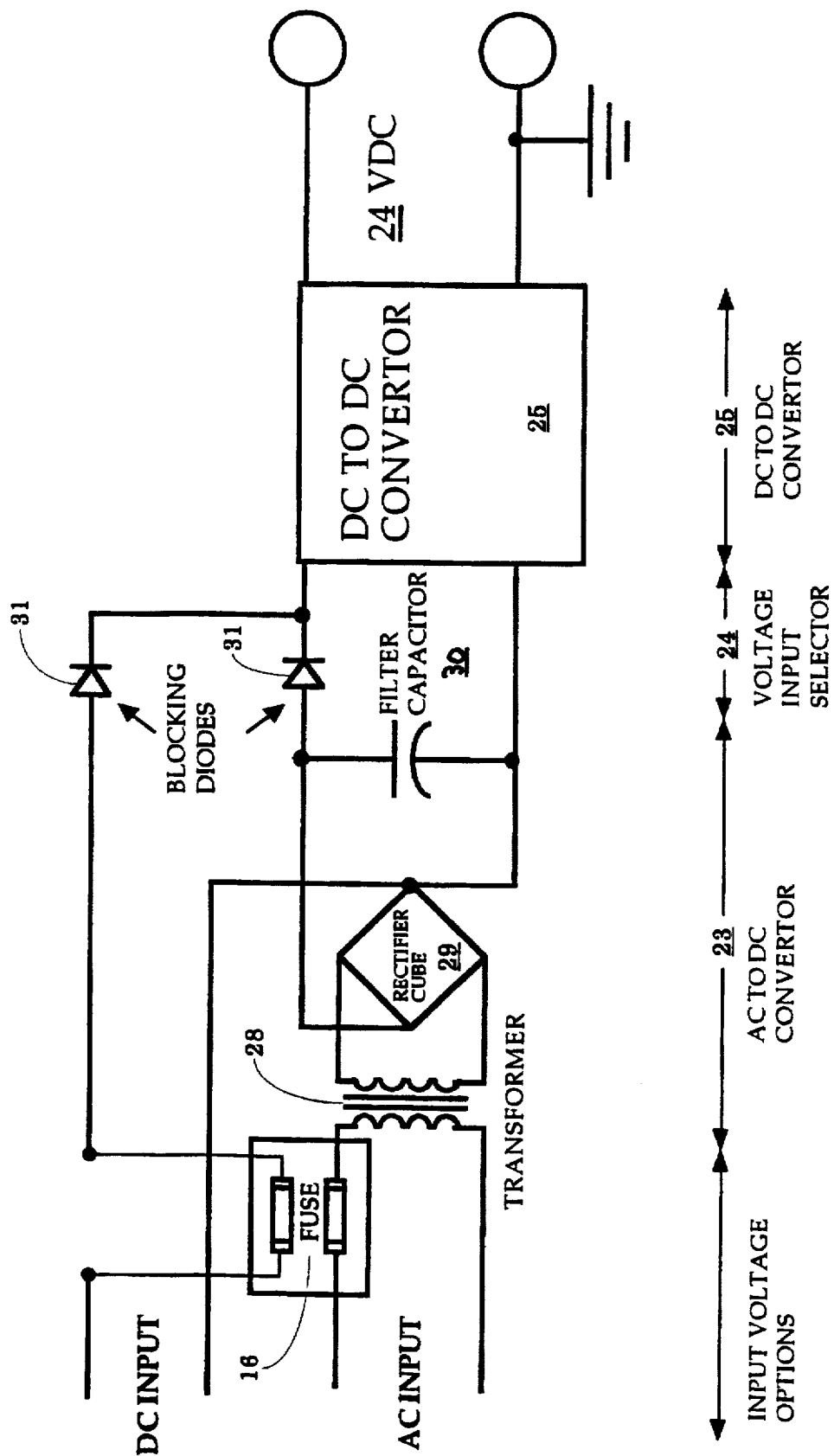
FIG. 3 is a circuit diagram of a preferred embodiment of our AC/DC power block except for the auto voltage and current selector.

FIG. 3 is a circuit diagram of the AC to DC convertor 23, the voltage input selector 24 and the DC to DC convertor 25 shown in FIG. 2. The AC input line includes a fuse 16 and a transformer 28 and is converted into direct current by rectifier cube 29 and its voltage determined by filter capacitor 30. DC input passes through a pair of blocking diodes 31 and its voltage determined by filter capacitor 30. DC power with its determined voltage flows into DC to DC convertor 25 where its voltage is set at 24 volts and transmitted to auto voltage selector 26.

Figure 4:
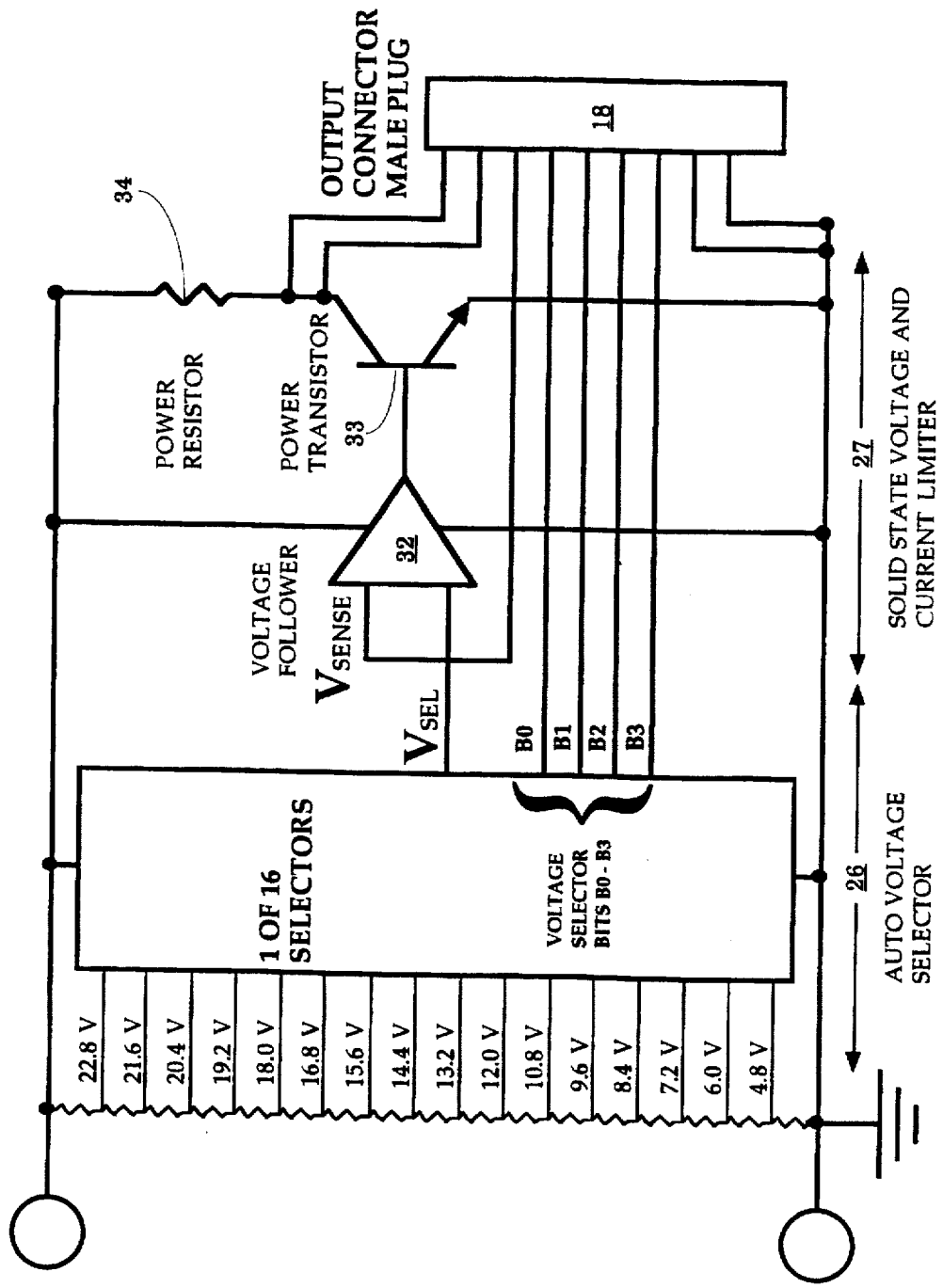
FIG. 4 is a circuit diagram of a preferred form of an auto voltage and current selector.

Auto voltage selector 26 as shown in FIG. 4 delivers a precision reference voltage Vsel to the solid state voltage and current limiter 27. The four voltage selector bits B0, B1, B2 and B3 are hard wired on the Power Connectors 19, 20 and 21 to be used by the normally battery powered tool. These four bits, representing sixteen combinations of binary 1's and 0's, are input to the 1 of 16 selectors which then selects the proper reference voltage from the power resistor 34 divider network and outputs this voltage as Vsel.

Voltage follower 32, power transistor 33 and power resistor work together as a generic power voltage regulator circuit to deliver constant rated voltage, with overcurrent limit protection, at the junction of the power resistor 34 and the power transistor 33. The power transistor 33 is biased by the voltage follower 32 based on the referenced voltage Vsel and the feedback voltage Vsense, which measures the actual voltage delivered to the tool's motor.

While we have shown and described a preferred form of our invention, the scope of our invention is in no way limited to what has been shown and described. The scope of our invention is defined only by the appended claims.

We claim:

1. A method of providing either AC or DC power for an electrically powered tool having a motor designed to be powered by an insertable battery which fits into a recess in the tool comprising providing a power block capable of being powered either by AC mains or DC power, the power block including an AC to DC convertor and a solid state current monitor which detects current drawn by the tool motor so that the power block can automatically set the voltage and current to be delivered to the tool's motor at the voltage and current required to produce the tool motor's full rated driving torque, providing an AC mains plug and a flexible line running from the AC mains plug to the power block, providing a first DC plug and a flexible line running from the first DC plug to the power block, providing a flexible line running from the power block to a second male DC plug, and providing a DC power connector designed to receive the second male DC plug and to fit into the empty recess in the electrically powered tool which recess normally receives the batteries which power the tool.

2. A method as set forth in claim 1 in which the power pack also includes a voltage input selector, a DC to DC convertor and an auto voltage selector in addition to the solid state current monitor.

3. Apparatus for use with tools powered by insertable batteries comprising a battery eliminator module identical in shape to the insertable battery of a tool which is insertable into the empty recess in the tool normally occupied by the insertable battery, a universal male plug connected to said battery eliminator module, an AC-DC power block designed to deliver power to the tool's motor at its rated current and voltage by connection to the universal male plug, and a power source connected to the AC-DC power block.

* * * * *